United States Patent
Tsai et al.

(10) Patent No.: US 9,490,739 B2
(45) Date of Patent: Nov. 8, 2016

(54) FAN SYSTEM—ROTATION SPEED CONTROL CIRCUIT AND METHOD FOR ROTATION SPEED ERROR AUTO-CALIBRATION THEREOF

(71) Applicant: ANPEC ELECTRONICS CORPORATION, Hsinchu (TW)

(72) Inventors: Ming-Jung Tsai, Changhua County (TW); Ching-Sheng Li, Hsinchu (TW); Kun-Min Chen, Hsinchu (TW); Chien-Cheng Chen, Taoyuan County (TW)

(73) Assignee: Anpec Electronics Corporation, Hsinchu (TW)

( * ) Notice: Subject to any disclaimer, the term of this patent is extended or adjusted under 35 U.S.C. 154(b) by 528 days.

(21) Appl. No.: 14/068,712

(22) Filed: Oct. 31, 2013

(65) Prior Publication Data

US 2015/0023801 A1    Jan. 22, 2015

(30) Foreign Application Priority Data

Jul. 17, 2013 (TW) .............................. 102125526 A

(51) Int. Cl.
*H02P 23/00* (2016.01)
*F04D 27/00* (2006.01)
*H02P 23/14* (2006.01)
*F04D 25/06* (2006.01)

(52) U.S. Cl.
CPC .......... *H02P 23/0068* (2013.01); *F04D 27/004* (2013.01); *H02P 23/14* (2013.01); *H02P 23/22* (2016.02); *F04D 25/0613* (2013.01)

(58) Field of Classification Search
CPC ........ H02P 23/22; H02P 23/14; G01P 21/02; F04D 27/004

USPC ................ 73/1.37; 454/184; 417/42; 702/96
See application file for complete search history.

(56) References Cited

U.S. PATENT DOCUMENTS

| | | | | |
|---|---|---|---|---|
| 2007/0156361 | A1* | 7/2007 | Hardt | H05K 7/20836 702/99 |
| 2007/0285038 | A1* | 12/2007 | Tsai | H02P 6/26 318/434 |
| 2008/0048598 | A1* | 2/2008 | Shibuya | H02P 6/185 318/400.1 |

(Continued)

FOREIGN PATENT DOCUMENTS

| CN | 101485077 A | 7/2009 |
|---|---|---|
| CN | 101127502 B | 6/2012 |

(Continued)

*Primary Examiner* — Michael A Lyons
*Assistant Examiner* — Suman K Nath
(74) *Attorney, Agent, or Firm* — Rosenberg, Klein & Lee

(57) ABSTRACT

A rotation speed control circuit with function of auto-calibrating rotation speed error is disclosed. The rotation speed control circuit includes a first multiplexer, a second multiplexer, an error amplifier and a current compensation circuit. In calibration mode, the rotation speed control circuit selects a calibration clock signal and a calibration voltage through the first multiplexer and the second multiplexer correspondingly according to a mode switch signal, and adjusts current value of a first current accordingly. In other words, the rotation speed control circuit utilizes the first current to compensate error of the external capacitor through the calibration clock signal fixed and the calibration voltage fixed in the duration of calibration mode, so as to avoid that aging of the external capacitor leads to rotation speed error and then affects the whole operation.

17 Claims, 6 Drawing Sheets

(56) References Cited

U.S. PATENT DOCUMENTS

2012/0007526 A1* 1/2012 Tsai .................... H02P 7/29
318/3
2012/0326643 A1 12/2012 Brannen

FOREIGN PATENT DOCUMENTS

| TW | 200540601 A | 12/2005 |
| TW | 201206048 A | 2/2012 |
| WO | 2008/007544 A2 | 1/2008 |

* cited by examiner

FAN SYSTEM—ROTATION SPEED CONTROL CIRCUIT AND METHOD FOR ROTATION SPEED ERROR AUTO-CALIBRATION THEREOF

BACKGROUND OF THE INVENTION

1. Field of the Invention

The instant disclosure relates to a rotation speed control circuit; in particular, to a rotation speed control circuit with function of auto-calibrating rotation speed error.

2. Description of Related Art

In the modern society of information technology, a computer system has become one of indispensable information tools, and whether for a desktop personal computer (PC), a laptop PC, or server, a clock operation of a central processor is increasing, and which results in an increasing heat dissipation, and a demand for heat dissipation appears to be more and more important. In prior art, heat dissipation is performed through maintaining a stable rotation speed of a fan. However, if system voltage changes or be affected by the wind pressure in a closed environment, the rotation speed of the fan may be changed. Therefore, the prior art usually need a rotation speed control circuit to control the rotation speed of the fan via negative feedback configuration of the rotation speed control circuit, so as to avoid over-fast or over-slow of the rotation speed of the fan.

U.S. Patent No. US 2012/0007526 disclose a rotation speed control circuit for controlling the rotation speed of the fan. The rotation speed control circuit comprises a rotation speed detector, a sample and hold element, an error amplifier and a pulse width modulation signal generator. The rotation speed detector, for generating a rotation speed voltage according to a rotation speed signal corresponding to the rotation speed. The sample and hold element is coupled to the rotation speed detector for sampling and storing the rotation speed voltage. The error amplifier is coupled to the sample and hold element for controlling a voltage of a filter capacitor according to the rotation speed voltage and a reference voltage, to adjust an error voltage. The pulse width modulation signal generator is coupled to the filter capacitor for generating a pulse width modulation signal according to the error voltage and a triangle wave. Accordingly, the rotation speed control circuit changes open time of the pulse width modulation signal according to the rotation speed, so as to maintain the rotation speed at the target rotation speed.

However, the charging capacitor disclosed by U.S. Patent No. US 2012/0007526 may generate phenomenon of the aging due to some factors, and capacitance value of the charging capacitor may deviate preset capacitance value of the charging capacitor in actual application, e.g. capacitance value of the charging capacitor decreases from 220 nF to 110 nF. Therefore, phenomenon of the aging of the charging capacitor will indirectly results in error of the rotation speed for the rotation speed control circuit, so as to affect operation of the rotation speed control circuit or the fan system.

SUMMARY OF THE INVENTION

The instant disclosure provides a rotation speed control circuit with function of auto-calibrating rotation speed error. The rotation speed control circuit comprises a first multiplexer, a second multiplexer, an error amplifier and a current compensation circuit. A first multiplexer is connected to a calibration clock signal and a rotation speed clock signal for outputting a first switch signal according to a mode switch signal, wherein after the first multiplexer receives the first switch signal via an edge-trigger detector, the first multiplexer sequentially outputs a second switch signal and a third switch signal with high voltage level when the first switch signal is in high voltage level. A second multiplexer is connected to a calibration voltage and a reference voltage for outputting a target voltage according to the mode switch signal. An error amplifier is connected to an external capacitor and the second multiplexer for outputting an error voltage according to a capacitor voltage and the target voltage. A current compensation circuit has a preset current value and is connected to the first switch signal, and the current compensation circuit adjusts a first current so as to compensate the external capacitor. In a calibration mode, the first and the second multiplexer choose the calibration clock signal and the calibration voltage respectively according to the mode switch signal and the rotation speed control circuit adjusts current value of the first current, wherein when the capacitor voltage of the external capacitor is larger than or equal to the target voltage, a calibration task is finished and voltage level of the error voltage is changed to high voltage level so that the current compensation circuit stops adjusting current value of the first current for compensating the external capacitor.

In an embodiment of the instant disclosure, the rotation speed control circuit further comprises a sampling and hold circuit and a comparator. A sampling and hold circuit is connected to the error amplifier for receiving the second switch signal and accordingly samples the error voltage and maintaining for a period of time, and outputs an sampling and hold voltage signal. A comparator receives a preset triangular wave signal and the preset triangular wave signal, and accordingly performs comparison operation so as to output a PWM rotation speed signal.

In an embodiment of the instant disclosure, wherein when capacitance value of the external capacitor deviates a preset capacitance value from capacitance value of X unit, the current compensation circuit gradually adjusts current value of the first current so as to compensate change of external capacitor, wherein X is a positive integer and current value of each unit of the first current corresponds to capacitance value of each unit of the external capacitor.

In an embodiment of the instant disclosure, wherein the current compensation circuit makes current value of the first current increase gradually so as to increase the capacitor voltage until the capacitor voltage is equal to the target voltage, for compensating change of the external capacitor.

In an embodiment of the instant disclosure, wherein the mode switch signal is used for determining whether the rotation speed control circuit is in the calibration mode or a normal mode, and when the rotation speed control circuit is in the normal mode, the first multiplexer chooses the rotation speed clock signal and the second multiplexer chooses the reference voltage.

In an embodiment of the instant disclosure, wherein after an electronic system with the rotation speed control circuit boosts, in a transient duration of boosting, the rotation speed control circuit enters into the calibration mode firstly and then the rotation speed control circuit enters into the calibration mode after each normal operation period, and the rotation speed control circuit enters into the normal mode between the two calibration modes adjacent after boosting of the electronic system.

In an embodiment of the instant disclosure, the rotation speed control circuit further comprises a charging switch and a discharging switch. One terminal of the charging switch is connected to the current compensation circuit, and another terminal of the charging switch is connected to external capacitor and the error amplifier. The charging switch determines switched-on or switched-off state according to the first switch signal, wherein when the charging switch is switched-on, the current compensation circuit outputs the first current for charging the external capacitor. One terminal of the discharging switch is connected to the external capacitor and the error amplifier, and another terminal of the discharging switch is connected to a ground voltage. The discharging switch determines switched-on or switched-off state according to the third switch signal, wherein when the discharging switch is switched-on, the external capacitor releases the capacitor voltage.

In an embodiment of the instant disclosure, wherein the current compensation circuit comprises a counter, a preset current source and N compensating current sources. A counter receives the error voltage and accordingly dominates a count value outputted, wherein in the calibration mode, when voltage level of the error voltage is low voltage level, the counter gradually adjusts the count value, and when voltage level of the error voltage is high voltage level, the counter maintains the count value. A preset current source has the preset current value, one terminal of the preset current source is connected to a power voltage, and another terminal of the preset current source is connected to one terminal of the charging switch. N compensating current sources respectively have a compensating current value. One terminal of the N compensating current sources are connected to the power voltage, and another terminal of the N compensating current sources is respectively connected to one terminal of N compensation switches correspondingly, wherein another terminal of the compensation switches are connected to one terminal of the charging switch and receive the count value so as to determine switched-on or switched-off state. Current value of the first current is equal to sum of preset current value and M compensating current value, and N is positive integer and M is integer ranged from zero to N.

The instant disclosure provides a method for auto-calibrating rotation speed error, used for a rotation speed control circuit. The rotation speed control circuit comprises a first multiplexer, a second multiplexer, an error amplifier, a current compensation circuit, a sampling and hold circuit and a comparator. The first multiplexer is connected to a calibration clock signal and a rotation speed clock signal, and outputs a first switch signal according to a mode switch signal. After receiving the first switch signal via an edge-trigger detector, the first multiplexer sequentially outputs a second switch signal and a third switch signal with high voltage level in the duration of high voltage level of the first switch signal. The second multiplexer is connected to a calibration voltage and a reference voltage and outputs a target voltage according to the mode switch signal. The error amplifier is connected to an external capacitor and the second multiplexer so as to respectively receive a capacitor voltage and the target voltage and accordingly outputs an error voltage. The current compensation circuit is connected to the first switch signal for compensating the external capacitor via adjusting current value of the first current. the method for auto-calibrating rotation speed error comprises steps as follows: entering into a calibration mode according to the mode switch signal; choosing the calibration clock signal and the calibration voltage; compensating the external capacitor via adjusting current value of the first current; determining whether the capacitor voltage is larger than or equal to target voltage; and when the capacitor voltage is larger than or equal to target voltage, a calibration task is finished and voltage level of the error voltage is changed to high voltage level.

The instant disclosure provides a fan system. The fan system comprises a rotation speed control circuit, a fan driving circuit, a fan and a feedback circuit. The rotation speed control circuit receives a rotation speed clock signal for controlling rotation speed. The fan driving circuit is connected to the rotation speed control circuit and receives a PWM rotation speed signal. The fan is connected to the fan driving circuit. The feedback circuit generates the rotation speed clock signal and transmits the rotation speed clock signal to the rotation speed control circuit according to rotation speed of the fan.

In summary, the fan system, the rotation speed control circuit and method thereof provided by the instant disclosure is able to make the first and the second multiplexer choose the calibration clock signal and the calibration voltage according to the mode switch signal when the rotation speed control circuit operates in duration of calibration mode with open-loop configuration and the rotation speed control circuit adjusts current value of the first current provided by the current compensation circuit, wherein when the capacitor voltage is equal to the target voltage, the calibration task is finished and voltage level of the error voltage is changed to high voltage level for stop counting; which means, as long as a compensation goal is achieved, the current compensation circuit does not increase compensation current so as to compensate the external capacitor. In short, through the calibration clock signal fixed and the calibration voltage fixed, the instant disclosure may compensate error of the external capacitor through utilizing the first current in the calibration mode of short-time. Accordingly, the instant disclosure is able to avoid error of the rotation speed resulted from aging of the external capacitor, wherein error of the rotation speed results in operation of the fan system or the rotation speed control circuit.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the present disclosure. As used herein, the term "and/or" includes any and all combinations of one or more of the associated listed items.

[Embodiment of the Rotation Speed Control Circuit]

Figure 1:
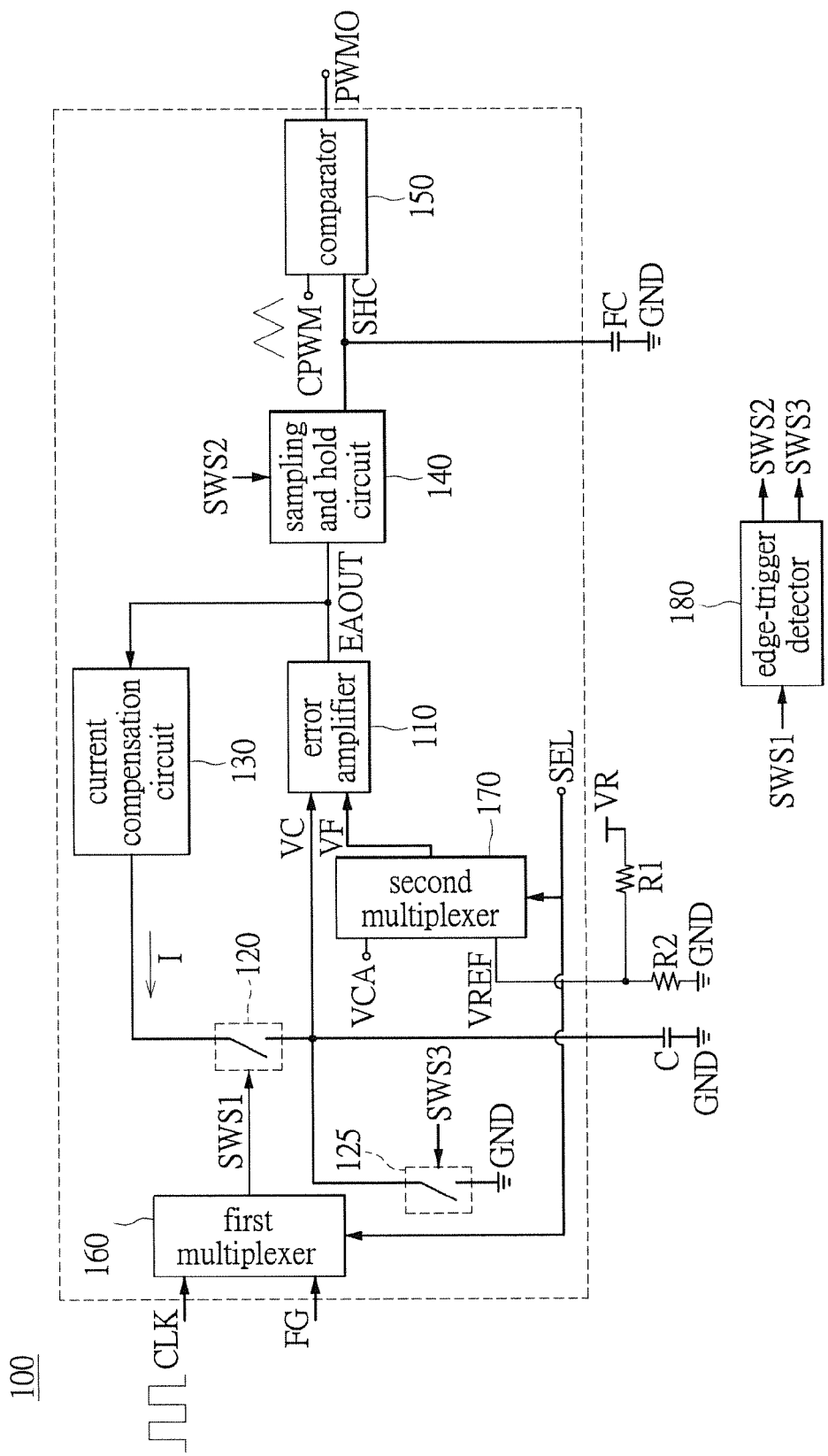
FIG. 1 shows a schematic view of the rotation speed control circuit according to embodiment of the instant disclosure.

Referring to FIG. 1, FIG. 1 shows a schematic view of the rotation speed control circuit according to embodiment of the instant disclosure. Through the calibration clock signal fixed and the calibration voltage fixed, the instant disclosure may compensate error of the external capacitor through utilizing the first current in the calibration mode of short-time, so as to avoid aging of the external capacitor or error of the capacitance value affecting normal operation of the rotation speed control circuit 100. As shown in FIG. 1, the rotation speed control circuit 100 with function of auto-calibrating rotation speed error comprises an error amplifier 110, a charging switch 120, a discharging switch 125, a current compensation circuit 130, a sampling and hold circuit 140, a comparator 150, a first multiplexer 160 and a second multiplexer 170. The error amplifier 110 is connected to the external capacitor C and the second multiplexer 170. The sampling and hold circuit 140 is connected to the error amplifier 110. The comparator 150 is connected to the sampling and hold circuit 140. The first multiplexer 160 is connected to control terminal of the charging switch 120. The current compensation circuit 130 is connected to one terminal of the charging switch 120 and is connected between error amplifier 110 and the sampling and hold circuit 140. Another terminal of the charging switch 120 is connected to one terminal of the external capacitor C and the error amplifier 110. One terminal of the discharging switch 125 is connected to one terminal of the external capacitor C, another terminal of the charging switch 120 and the error amplifier 110, and another terminal of the discharging switch 125 is connected to a ground voltage GND, wherein another terminal of the external capacitor C is also connected to the ground voltage GND.

Regarding the first multiplexer 160, the first multiplexer 160 is connected to a calibration clock signal CLK and a rotation speed clock signal FG for choosing one of the calibration clock signal CLK and the rotation speed clock signal FG according to a mode switch signal SEL so as to output a first switch signal SWS1 to control terminal of the charging switch 120. In the present embodiment, frequency of the first switch signal SWS1 is two times of frequency of the calibration clock signal CLK or two times of frequency of the rotation speed clock signal FG. In another embodiment, frequency of the first switch signal SWS1 is any times of frequency of the calibration clock signal CLK or any times of frequency of the rotation speed clock signal FG. In yet another embodiment, frequency of the first switch signal SWS1 is equal to frequency of the calibration clock signal CLK or equal to frequency of the rotation speed clock signal FG, and the instant disclosure is not restricted thereto. Moreover, switched-on or switched-off state of the charging switch 120 may action correspondingly according to high voltage level and low voltage level of the first switch signal SWS1, wherein designer can take the actual circuit design into consideration to determine the extent of frequency-up. Furthermore, in the present embodiment, system may continuously and automatically transmit the mode switch signal SEL with a fixed period, and then when voltage level of the mode switch signal SEL is high voltage level, the rotation speed control circuit 100 enters into a calibration mode, and then the first multiplexer 160 chooses the calibration clock signal CLK and increases frequency of the calibration clock signal CLK to be a first switch signal SWS1. In the other hand, when voltage level of the mode switch signal SEL is low voltage level, the rotation speed control circuit 100 enters into a normal mode, and then first multiplexer 160 chooses the rotation speed clock signal FG and increases frequency of rotation speed clock signal FG to be the first switch signal SWS1.

Regarding the second multiplexer 170, the second multiplexer 170 is connected to a calibration voltage VCA and a reference voltage VREF for choosing one of the calibration voltage VCA and the reference voltage VREF to be served as a target voltage VF according to the mode switch signal SEL. Furthermore, in the present embodiment, when voltage level of the mode switch signal SEL is high voltage level, the rotation speed control circuit 100 enters into the calibration mode and then the second multiplexer 170 chooses the calibration voltage VCA to be served as the target voltage VF. In the other hand, when voltage level of the mode switch signal SEL is low voltage level, the rotation speed control circuit 100 enters into the normal mode and then the second multiplexer 170 chooses the reference voltage VREF to be served as the target voltage VF.

Regarding the error amplifier 110, the error amplifier 110 respectively receives a capacitor voltage VC of the external capacitor C and the target voltage VF outputted from the second multiplexer 170, and then amplifies a voltage difference of the capacitor voltage VC and the target voltage VF. In the present embodiment, in the calibration mode, when capacitor voltage VC starts to be equal to or larger than target voltage VF, the error amplifier 110 outputs the error voltage EAOUT to the current compensation circuit 130.

Regarding the current compensation circuit 130, the current compensation circuit 130 has a preset current value, and the current compensation circuit 130 determines whether to compensate error of capacitor of the external capacitor C through adjusting current value of the first current I according to voltage level of the error voltage EAOUT. Furthermore, in the calibration mode, when the capacitor voltage VC is not equal to the target voltage VF yet, the error amplifier 110 outputs the error voltage VF with low voltage level to the current compensation circuit 130 for adjusting current value of the first current I, so as to continuously compensate error of the external capacitor C. When the capacitor voltage VC starts to be equal to the target voltage VF, the error amplifier 110 outputs the error voltage VF with high voltage level to the current compensation circuit 130 so as to indicate the current compensation circuit 130 to stop adjusting current value of the first current I; which means, current value of the first current I is substantially enough to compensate error of the external capacitor C now.

Regarding the charging switch 120, the charging switch 120 determines switched-on or switched-off state itself according to the first switch signal SWS1, wherein in the present embodiment, the charging switch 120 may be high-active device (e.g. N-type metal-oxide-semiconductor transistor). When the charging switch 120 is switched-on, the current compensation circuit 130 outputs the first current I for charging the external capacitor C.

Regarding the discharging switch 125, the discharging switch 125 determines switched-on or switched-off state itself according to the third switch signal SWS3, wherein in the present embodiment, the discharging switch 125 may be high-active device (e.g. N-type metal-oxide-semiconductor transistor). When the discharging switch 125 is switched-on, capacitor voltage VC of the external capacitor C is released to zero voltage level, i.e. a ground voltage GND.

There is further instruction in teaching an operation mechanism of the rotation speed control circuit 100.

Referring to FIG. 1 continuously, after an electronic system with the rotation speed control circuit 100 boosts, in a transient duration of boosting, the rotation speed control circuit 100 with an open-loop configuration automatically enters into the calibration mode and adjusts current value of the first current I through the current compensation circuit 130 for compensating error of capacitance value of the external capacitor C. In other words, the instant disclosure utilizes the first current I to compensate error of capacitance value of the external capacitor C through the calibration clock signal CLK fixed (e.g. 1 ms) and a calibration voltage VCA fixed (e.g. 5 volt) in the calibration mode of short-time (e.g. tens of milliseconds), so as to avoid affecting normal operation of the rotation speed control circuit 100 resulted from aging of the external capacitor C. More specifically, spirit of the invention of the instant disclosure is as shown in equation (1); which means, if capacitance value of the external capacitor C is larger than preset capacitance value, the current compensation circuit 130 increase current value of the first current I upwardly, and similarly, if capacitance value of the external capacitor C is smaller than preset capacitance value, the current compensation circuit 130 decrease current value of the first current I downwardly, so as to compensate error of the external capacitor C through adjusting first current I, wherein T is a period of the first switch signal SWS1. Afterwards, after each normal operation period, the rotation speed control circuit 100 may automatically enter into the calibration mode again for compensating the external capacitor C, wherein the rotation speed control circuit 100 enters into the normal mode between two calibration modes adjacent. The following contents of this disclosure will further instruct operation of entering into the normal mode for the rotation speed control circuit 100.

$$C \times V = I \times T \quad (1)$$

In the present embodiment, system may automatically transmit the mode switch signal SEL for switching the calibration mode and the normal mode of the rotation speed control circuit 100, wherein the mode switch signal SEL with high voltage level represents the calibration mode, and the mode switch signal SEL switches between high voltage level and low voltage level periodically. It is to be noted that, current value of each unit of the first current I corresponds to capacitance value of each unit of the external capacitor C, and designer may design it according to demand of actual circuit application, wherein X is a positive integer. It is worth mentioned that, the first switch signal SWS1 of the present embodiment is generated by edge-triggering of calibration clock signal CLK or the rotation speed clock signal FG, and the rotation speed control circuit 100 of the instant disclosure receives the first switch signal SWS1 via the edge-trigger detector 180. In the present embodiment, when the edge-trigger detector 180 detects rising edge of the first switch signal SWS1, the edge-trigger detector 180 respectively outputs the second switch signal SWS2 and the third switch signal SWS3 with high voltage level to the sampling and hold circuit 140 and the discharging switch 125.

Next, the second multiplexer 170 chooses the calibration voltage VCA and makes the calibration voltage VCA to be served as the target voltage VF according to the mode switch signal SEL, and the second multiplexer 170 transmits the target voltage VF to the error amplifier 110. The first multiplexer 160 chooses the calibration clock signal CLK according to the mode switch signal SEL and transmits the first switch signal SWS1 to the charging switch 120, wherein frequency of the first switch signal SWS1 is two times of frequency of the calibration clock signal CLK in the present embodiment, but the instant disclosure is not restricted thereto, and designer may do different setting according to demand of actual circuit application. In the present embodiment, the current compensation circuit 130 gradually increases current value of the first current I according to the error voltage EAOUT received so as to gradually increase capacitor voltage VC at each switch period (e.g. switch period of the charging switch 120). When the capacitor voltage VC is smaller than the target voltage VF (i.e. the calibration task is not finished yet), voltage level of the error voltage EAOUT outputted from the error amplifier 110 may maintain low voltage level. Next, the current compensation circuit 130 may continuously increase current value of the first current I so as to increase the capacitor voltage VC of the external capacitor C at the next switch period.

In the compensation duration of continuously adjusting current value of the first current I so as to compensate the external capacitor C by the current compensation circuit 130, when the capacitor voltage VC of the capacitor voltage VC starts to be equal to the target voltage VF, the error voltage EAOUT with low voltage level is changed to the error voltage EAOUT with high voltage level by the error amplifier 110 and the error amplifier 110 outputs the error voltage EAOUT with high voltage level to the current compensation circuit 130 so as to indicate the current compensation circuit 130 to stop adjusting current value of the first current. Afterwards, after a preset calibration time (e.g. 80 ms in one embodiment) of the calibration mode is finished, the rotation speed control circuit 100 with function of auto-calibrating rotation speed error will be converted to closed-loop configuration and enters into the normal mode, and then after maintaining a normal operation period, the rotation speed control circuit 100 enters into the calibration mode again. In the normal mode, the first and the second multiplexer 160 and 170 may respectively choose the rotation speed clock signal FG and the reference voltage VREF according to the mode switch signal SEL with low voltage level, wherein the reference voltage VREF is generated from a Low DropOut Regulator and a voltage-dividing circuit. The voltage-dividing circuit is configured by a first resistor R1 and a second resistor R2 and the first resistor R1 is connected between a voltage VR and the second resistor R2, and the second resistor R2 is connected between the ground voltage GND and the second multiplexer 170. Compared to preset calibration time (e.g. 80 ms), the normal operation period may be ranged from a few minutes to a few hours of time, so it does not affect total operation of rotation speed control circuit 100.

For a specific instruction on an operation process of the rotation speed control circuit 100 of the instant disclosure, there is at least one of the embodiments for further instruction.

In the following embodiments, there are only parts different from embodiments in FIG. 1 described, and the omitted parts are indicated to be identical to the embodiments in FIG. 1. In addition, for an easy instruction, similar reference numbers or symbols refer to elements alike.

[Another Embodiment of the Rotation Speed Control Circuit]

Figure 2:
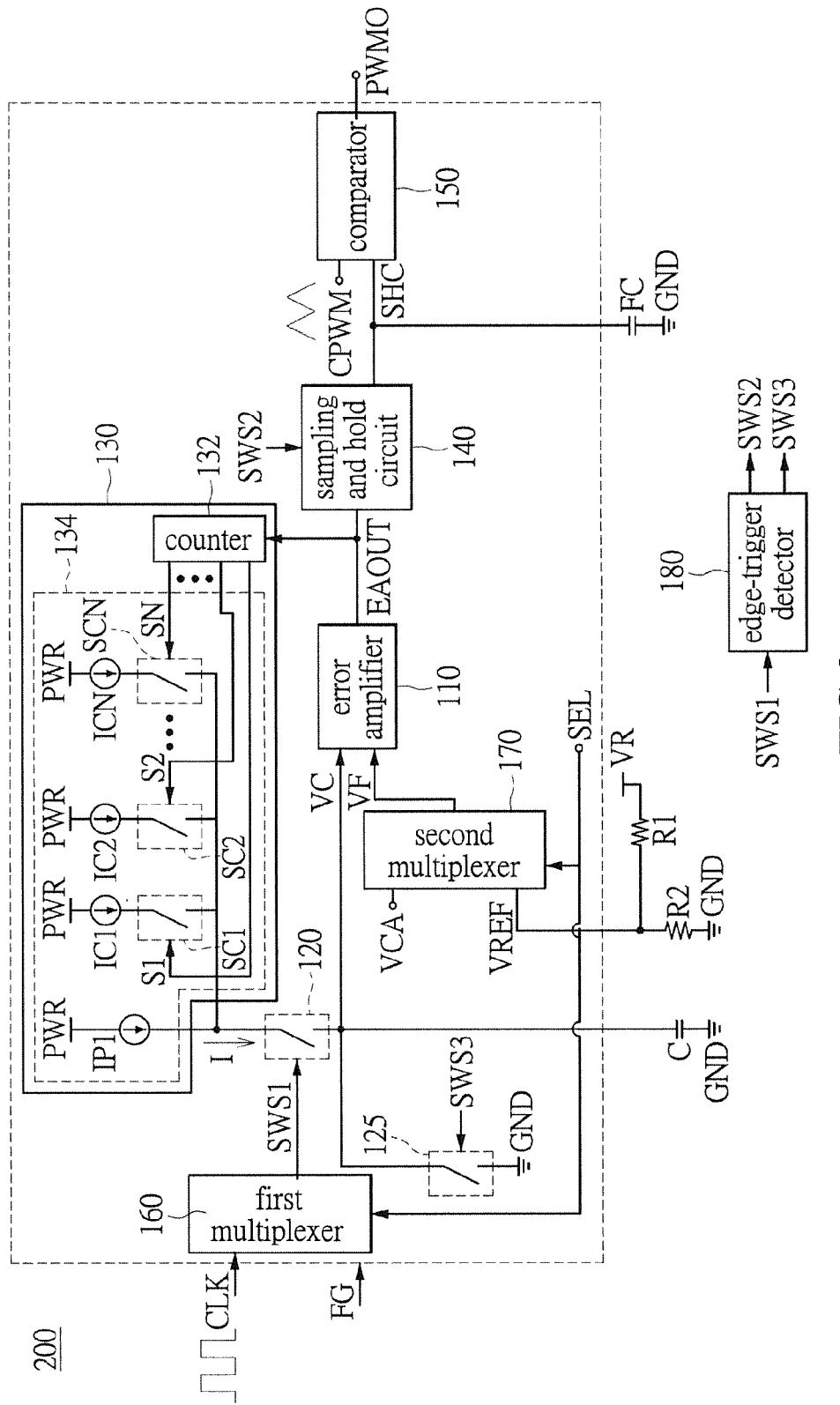
FIG. 2 shows detailed circuit schematic view of the rotation speed control circuit according to another embodiment of the instant disclosure.

Referring to FIG. 2, FIG. 2 shows detailed circuit schematic view of the rotation speed control circuit according to another embodiment of the instant disclosure. In the present embodiment, difference from above-mentioned embodiment in FIG. 1 is that the current compensation circuit 130 comprises a counter 132 and a current adjusting unit 134 connected to the counter 132, wherein the current adjusting unit 134 receives count values S1~SN of the counter 132 and accordingly determines current value of the first current I, wherein the count value S1 corresponds to the least significant bit (LSB) and the count value SN corresponds to the most significant bit (MSB), N is a positive integer. In the present embodiment, the current adjusting unit 134 comprises a preset current source IP1 and N compensating current sources IC1~ICN. The counter 130 is connected to the error voltage EAOUT and accordingly control the count values S1~SN. In the calibration mode, when voltage level of the error voltage EAOUT is low voltage level, the counter 132 may gradually adjust the count values S1~SN. When voltage level of the error voltage EAOUT is changed from low voltage level to high voltage level, the counter 132 maintains the count values S1~SN. The preset current source IP1 has a preset current value, and one terminal of the preset current source IP1 is connected to a power voltage PWR, and another terminal of the preset current source IP1 is connected to one terminal of the charging switch 120. The N compensating current sources IC1~ICN respectively has a compensating current value, and one terminal of each of the N compensating current sources IC1~ICN is connected to the power voltage PWR, and another terminal of each of the compensating current source IC1~ICN is connected to one terminal of the charging switch 120 via the compensation switches SC1~SCN respectively, wherein the N compensation switches SC1~SCN determine switched-on or switched-off state according to the count values S1~SN (digital form) received. It is to be noted that, in the present embodiment, current value of the first current I is a sum of preset current value and the M compensating current value, wherein M is a positive integer ranged from zero to N.

There is further instruction in teaching an operation mechanism of the rotation speed control circuit 200.

Figure 3:
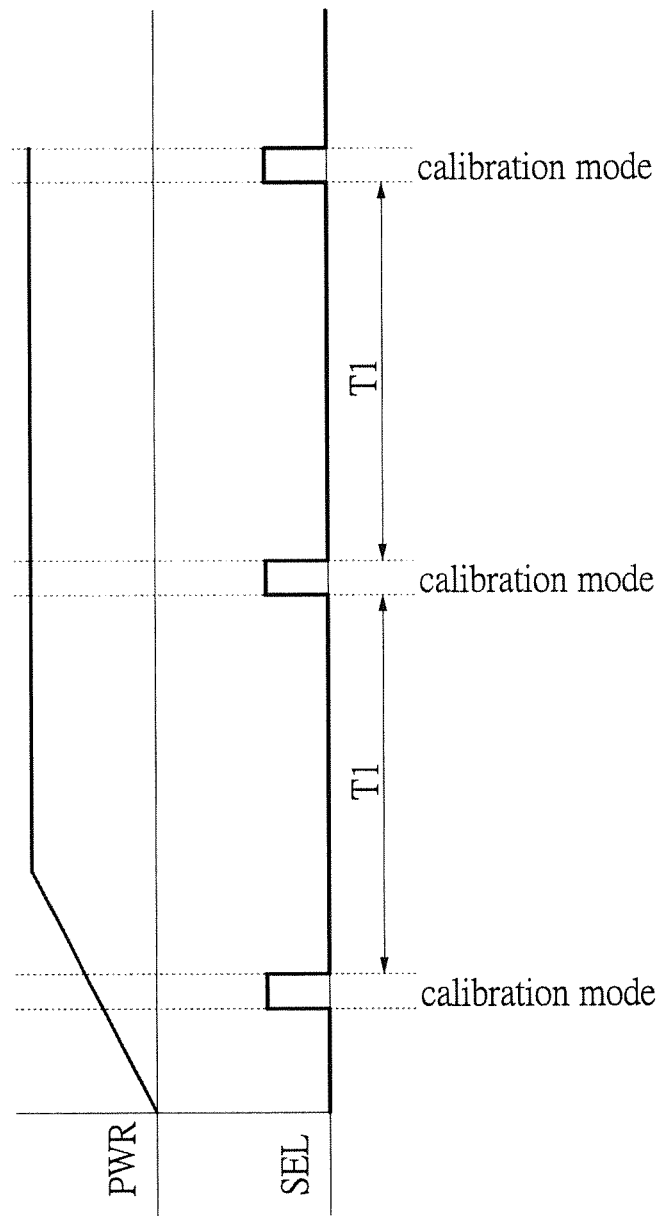
FIG. 3 shows schematic view of mode switch of the rotation speed control circuit according to the embodiment of the instant disclosure.
Figure 4:
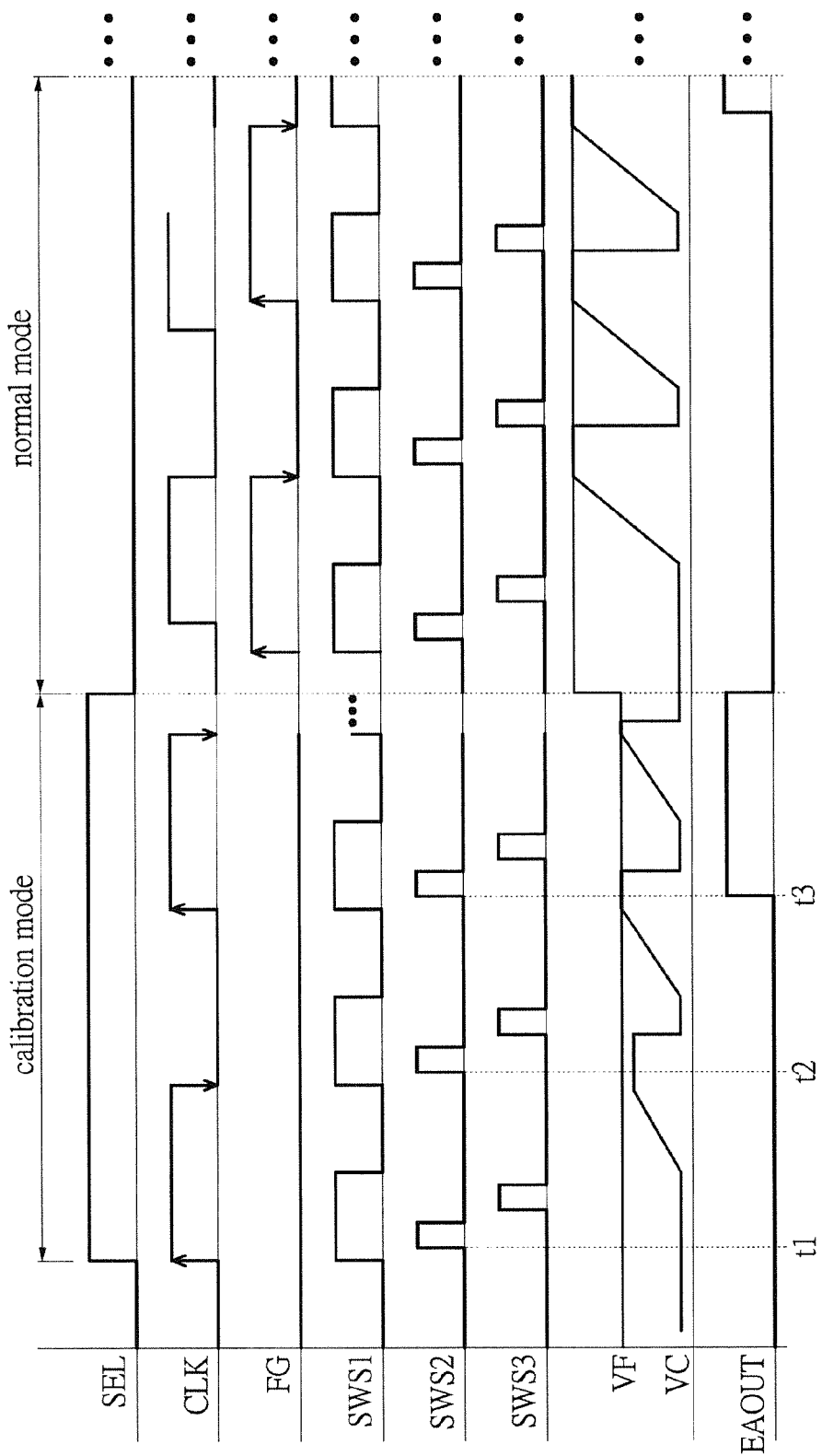
FIG. 4 shows driving waveform diagram of the rotation speed control circuit according to the embodiment of the instant disclosure.

Referring to FIGS. 2~4, FIG. 3 shows schematic view of mode switch of the rotation speed control circuit according to the embodiment of the instant disclosure. FIG. 4 shows driving waveform diagram of the rotation speed control circuit according to the embodiment of the instant disclosure. As shown in FIG. 3, after an electronic system with the rotation speed control circuit 200 boosts (e.g. rising duration of the power voltage PWR, or transient duration of boosting), the rotation speed control circuit 200 with an open-loop configuration enters into the calibration mode firstly, and adjusts current value of the first current I through the current compensation circuit 130 foe compensating error of the external capacitor C. After ending the calibration mode, the electronic system enters into the normal mode; which means, between two calibration modes adjacent after boosting, the rotation speed control circuit 200 enters into the normal mode. Moreover, the rotation speed control circuit 200 enters into the calibration mode (e.g. calibration time is about tens of milliseconds) for auto-compensating mechanism after each normal operation period T1 (e.g. about a few minutes to a few hours), therefore operation of the rotation speed control circuit 200 does not be affected. Referring to FIG. 2 with respect to FIG. 4 for following embodiment, and there is further instruction in teaching an operation mechanism of the rotation speed control circuit 200 in the calibration mode.

It is to be noted that, current value of each unit of the first current I corresponds to capacitance value of each unit of the external capacitor C, and designer may design according to demand of actual circuit application, wherein X is positive integer.

Before further instruction, it is clarified that in the present embodiment, if a preset capacitance value of the external capacitor C is 220 nF, current value of the first current I need to achieve 110 uA for satisfying equation (1). Therefore, when preset current value of the preset current source IP1 is 55 uA and capacitance value of the external capacitor C is 110 nF remaining, current value of the first current I may be adjusted to 55 uA by the current compensation circuit 130 for satisfying equation (1).

Next, in the calibration mode, the second multiplexer 170 chooses the calibration voltage VCA and makes the calibration voltage VCA to be served as the target voltage VF according to the mode switch signal SEL, and the second multiplexer 170 transmits the target voltage VF to the error amplifier 110. The first multiplexer 160 chooses the calibration clock signal CLK according to the mode switch signal SEL and transmits the first switch signal SWS1 to the charging switch 120, wherein frequency of the first switch signal SWS1 is two times of frequency of the calibration clock signal CLK in the present embodiment (as shown in FIG. 4), but the instant disclosure is not restricted thereto, and designer may do different setting according to demand of actual circuit application. In the present embodiment, the current compensation circuit 130 gradually increases current value of the first current I according to the error voltage EAOUT received so as to gradually increase capacitor voltage VC at each switch period (e.g. switch period of the charging switch 120).

As shown in FIG. 4, the charging switch 120 is low-active, and the discharging switch 125 and the sampling and hold circuit 140 are high-active. When the first switch signal SWS1 is high voltage level, voltage level of the second and the three switch signal SWS2, SWS3 are sequentially changed from low voltage level to high voltage level and then changed from high voltage level to low voltage level for finishing a process, i.e., charging, sampling and discharging. When voltage level of the first switch signal is low voltage level, the charging switch 120 may be switched-on so that current compensation circuit 130 charges the external capacitor C. Afterwards, voltage level of the first switch signal SWS1 is changed from low voltage level to high voltage level so as to disable the charging switch 120. When voltage level of the first switch signal SWS1 is high voltage level, the sampling and hold circuit 140 may receive an enable signal for sampling, wherein the enable signal is the second switch signal SWS2 with high voltage level. After voltage level of the second switch signal SWS2 is changed from high voltage level to low voltage level, the discharging switch 125 may receive a enable signal for discharging the external capacitor C, wherein the enable signal is the third switch signal SWS3 with high voltage level. Furthermore, at time t1 and t2, because the capacitor voltage VC is smaller than the target voltage VF (i.e., the calibration task is not finished yet), the error voltage EAOUT outputted from the error amplifier 110 may maintain low voltage level. The counter 132 may gradually count after receiving the error voltage EAOUT with low voltage level and respectively transmit the count values S1~SN to the compensation switch SC1~SCN. For example, suppose N is equal to 8, at time t1, the counter 132 with eight bits transmits the count value SC1~SC8 of digital signal [0000_0001] to the compensation switch SC1~SC8 correspondingly, wherein the count value SC1 corresponds to LSB and the count value SC8 corresponds to MSB. Therefore, the compensation switch SC1 may be switched-on and the other compensation switches SC2~SC8 may be switched-off, so that the preset current source IP1 and the compensating current source IC1 output current to the external capacitor C together; which means, current value of the first current I is equal to a sum of the preset current value and the compensating current value of the compensating current source IC1. In the present embodiment, the compensating current value of the compensating current source IC1 is 1% of the preset current value. At time t2, the counter 132 with eight bits transmits the count values SC1~SC8 of digital signal [0000_0010] to the compensation switches SC1~SC8 correspondingly. Therefore, the compensation switch SC2 may be switched-on and the other compensation switches SC1, and SC3~SC8 may be switched-off, so that the preset current source IP 1 and the compensating current source IC2 output current to the external capacitor C together; which means current value of the first current I is equal to a sum of the preset current value and the compensating current value of the compensating current source IC2. In the present embodiment, the compensating current value of the compensating current source IC2 is 2% of the preset current value. It is to be noted that, in the present embodiment, ratio of the compensating current value of the compensating current sources IC1~IC8 is 1:2:4:8:16:32:64:128:256, but the embodiment is not restricted thereto, and designer may modify design of current value according to circuit design or demand of actual application. In short, the current compensation circuit 130 may continuously increase current value of the first current I at next switch period for increasing the capacitor voltage VC of the external capacitor C.

In the compensation duration; which means, the current adjusting unit 134 and the counter 132 increase current value of the first current I for compensating the external capacitor C. When the capacitor voltage VC sampled at time t3 is larger than the target voltage VF, voltage level of the error voltage EAOUT is changed from low voltage level to high voltage level by the error amplifier 110 and the error voltage EAOUT with high voltage level is transmitted to the counter 132 so as to indicate the counter 132 to stop counting, and to maintain the count values S1~SN currently, e.g. [0000_0010]. Moreover, a filter capacitor FC may be charged by the error voltage EAOUT with form of current via the sampling and hold circuit 140 by the error amplifier 110; which means, the comparator 150 receives the sampling and hold voltage signal SHC and compares the sampling and hold voltage signal SHC with preset triangular wave signal CPWM, and then outputs a PWM rotation speed signal PWMO according to a comparison result. Afterwards, after preset calibration time (e.g. 80 ms) of the calibration mode is finished, the rotation speed control circuit 100 with function of auto-calibrating rotation speed error will be converted to closed-loop configuration and enters into the normal mode, and then after maintaining a normal operation period, the rotation speed control circuit 100 enters into the calibration mode again. Compared to preset calibration time (e.g. 80 ms), the normal operation period may be ranged from a few minutes to a few hours of time, so it does not affect total operation of rotation speed control circuit 100. Accordingly, the instant disclosure is able to avoid error of the rotation speed resulted from aging of the external capacitor, wherein error of the rotation speed results in operation of the fan system or the rotation speed control circuit.

In summary, ideas which are relative to compensate error of the external capacitor for satisfying equation (1) through a calibration clock signal fixed and a calibration voltage fixed in the calibration mode of short time are within the scope of the technique and the idea of the instant disclosure.

[One Embodiment of the Fan System with the Rotation Speed Control Circuit]

Figure 5:
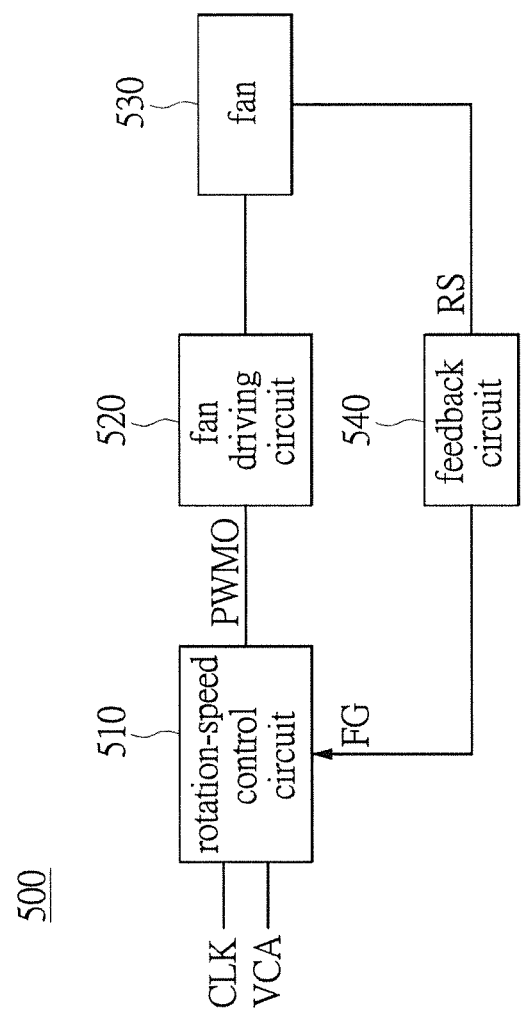
FIG. 5 shows circuit block view of the fan system with the rotation speed control circuit according to the embodiment of the instant disclosure.

Referring to FIG. 5, FIG. 5 shows circuit block view of the fan system with the rotation speed control circuit according to the embodiment of the instant disclosure. The fan system 500 comprises a rotation speed control circuit 510, a fan driving circuit 520, a fan and a feedback circuit 540. The rotation speed control circuit 510 receives a rotation speed clock signal FG for controlling a rotation speed, and receives a calibration clock signal CLK and a calibration voltage VCA for compensating error of capacitance value of the external capacitor. The fan driving circuit 520 is connected to the rotation speed control circuit 510 and receives a PWM rotation speed signal PWMO. The fan 530 is connected to the fan driving circuit 520. The feedback circuit 540 is configured for generating the rotation speed clock signal FG according to a rotation speed RS and transmits the rotation speed clock signal FG to the rotation speed control circuit 510. In the present embodiment, the rotation speed control circuit 510 with function of auto-calibrating rotation speed error may be one of the rotation speed control circuits 100 and 200 above-mentioned.

[One Embodiment of the Method for Auto-Calibrating Rotation Speed Error]

Figure 6:
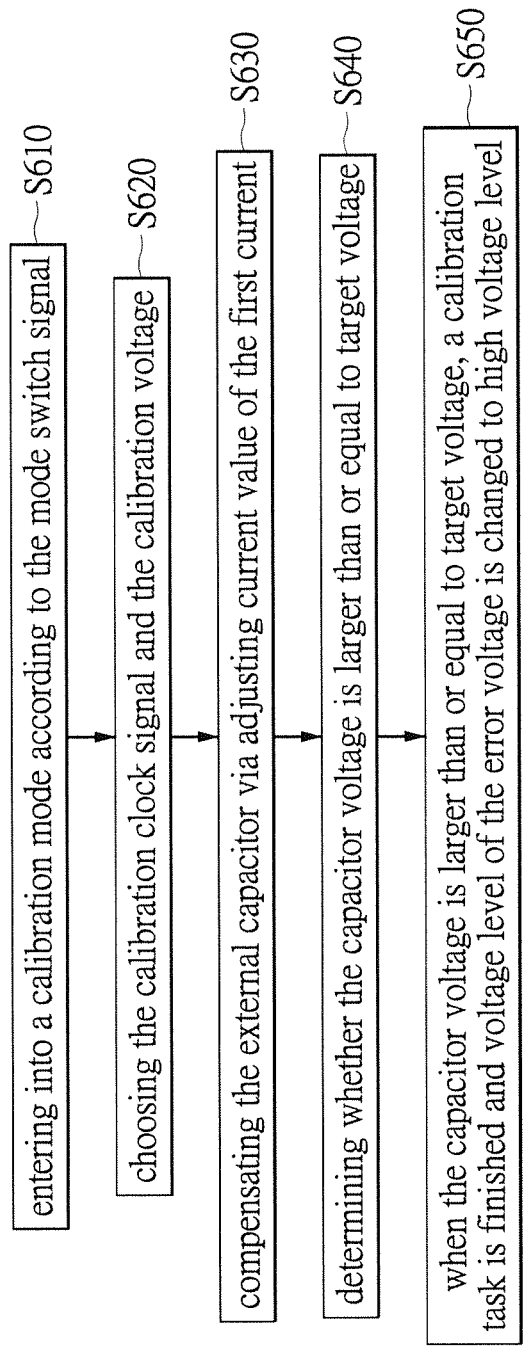
FIG. 6 shows flow diagram of the method for auto-calibrating rotation speed error according to the embodiment of the instant disclosure.

Referring to FIG. 6, FIG. 6 shows flow diagram of the method for auto-calibrating rotation speed error according to the embodiment of the instant disclosure. An explanatory sequence of steps in the present embodiment may be embodied with the rotation speed control circuit 100 as shown in FIG. 1 or the rotation speed control circuit 200 in FIG. 2, and thus please refer to FIGS. 1 and 2 for an easy understanding. The method for auto-calibrating rotation speed error comprises steps as follows: entering into a calibration mode according to the mode switch signal (step S610); choosing the calibration clock signal and the calibration voltage (step S620); compensating the external capacitor via adjusting current value of the first current (step S630); determining whether the capacitor voltage is larger than or equal to target voltage (step S640); when the capacitor voltage is larger than or equal to target voltage, a calibration task is finished and voltage level of the error voltage is changed to high voltage level (step S650). Relevant details of the steps of the method for auto-calibrating rotation speed error regarding the rotation speed control circuit are described in the embodiments of FIGS. 1-5, and thus it is not repeated thereto.

It is clarified that, a sequence of steps in FIG. 6 is set for a need to instruct easily, and thus the sequence of the steps is not used as a condition in demonstrating the embodiments of the instant disclosure.

To sum up, the fan system, the rotation speed control circuit and method thereof provided by the instant disclosure is able to make the first and the second multiplexer choose the calibration clock signal and the calibration voltage according to the mode switch signal when the rotation speed control circuit operates in duration of calibration mode with open-loop configuration and the rotation speed control circuit periodically entering into the calibration mode adjusts current value of the first current provided by the current compensation circuit, wherein when the capacitor voltage is larger than or equal to the target voltage, the calibration task is finished and voltage level of the error voltage is changed to high voltage level for stop counting and the sampling and hold circuit is enabled, so as to compensate error of capacitance value of the external capacitor In short, through the calibration clock signal fixed and the calibration voltage fixed, the instant disclosure may compensate error of the external capacitor through utilizing the first current in the calibration mode of short-time. Accordingly, the instant disclosure is able to avoid error of the rotation speed resulted from aging of the external capacitor, wherein error of the rotation speed results in operation of the fan system or the rotation speed control circuit.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A rotation speed control circuit with function of auto-calibrating rotation speed error, comprising:
    a first multiplexer, connected to a calibration clock signal and a rotation speed clock signal, for outputting a first switch signal according to a mode switch signal, wherein after an edge-trigger detector receives the first switch signal, the edge-trigger detector respectively outputs a second switch signal and a third switch signal with high voltage level when the first switch signal is in high voltage level;
    a second multiplexer, connected to a calibration voltage and a reference voltage, for outputting a target voltage according to the mode switch signal;
    an error amplifier, connected to an external capacitor and the second multiplexer, for outputting an error voltage according to a capacitor voltage and the target voltage;
    a current compensation circuit, having a preset current value, connected to the first switch signal, the current compensation circuit adjusting a first current so as to compensate the external capacitor;
    a sampling and hold circuit, connected to the error amplifier, for receiving the second switch signal and accordingly sampling the error voltage and maintaining for a period of time, and outputting an sampling and hold voltage signal; and
    a comparator, receiving a preset triangular wave signal and the sampling and hold voltage signal and accordingly performing comparison operation so as to output a PWM rotation speed signal,
    wherein in a calibration mode, the first and the second multiplexer choose the calibration clock signal and the calibration voltage respectively according to the mode switch signal and the rotation speed control circuit adjusts current value of the first current, wherein when the capacitor voltage of the external capacitor is larger than or equal to the target voltage, a calibration task is finished and voltage level of the error voltage is changed to high voltage level so that the current compensation circuit stops adjusting current value of the first current for compensating the external capacitor;
    wherein the current compensation circuit makes current value of the first current increase gradually so as to increase the capacitor voltage until the capacitor voltage is equal to the target voltage, for compensating change of the external capacitor.

2. The rotation speed control circuit according to claim 1, wherein when capacitance value of the external capacitor deviates a preset capacitance value from capacitance value of X unit, the current compensation circuit gradually adjusts current value of the first current so as to compensate change of external capacitor, wherein X is a positive integer and current value of each unit of the first current corresponds to capacitance value of each unit of the external capacitor.

3. The rotation speed control circuit according to claim 1, wherein the mode switch signal is used for determining whether the rotation speed control circuit is in the calibration mode or a normal mode, and when the rotation speed control circuit is in the normal mode, the first multiplexer chooses the rotation speed clock signal and the second multiplexer chooses the reference voltage.

4. The rotation speed control circuit according to claim 3, wherein after an electronic system with the rotation speed control circuit boosts, in a transient duration of boosting, the rotation speed control circuit enters into the calibration mode firstly and then the rotation speed control circuit enters into the calibration mode after each normal operation period, and the rotation speed control circuit enters into the normal mode between the two calibration modes adjacent after boosting of the electronic system.

5. The rotation speed control circuit according to claim 1, further comprising:
    a charging switch, having one terminal connected to the current compensation circuit, having another terminal connected to the external capacitor and the error amplifier, the charging switch determining switched-on or switched-off state according to the first switch signal, wherein when the charging switch is switched-on, the current compensation circuit outputs the first current for charging the external capacitor; and
    a discharging switch, having one terminal connected to the external capacitor and the error amplifier, having another terminal connected to a ground voltage, the discharging switch determining switched-on or switched-off state according to the third switch signal, wherein when the discharging switch is switched-on, the external capacitor releases the capacitor voltage,
    wherein in the calibration mode, when the first switch signal is changed from high voltage level to low voltage level, the third switch signal is changed from low voltage level to high voltage level.

6. The rotation speed control circuit according to claim 5, wherein the current compensation circuit comprises:
    a counter, receiving the error voltage and accordingly dominating a count value outputted, wherein in the calibration mode, when voltage level of the error voltage is low voltage level, the counter gradually adjusts the count value, and when voltage level of the error voltage is high voltage level, the counter maintains the count value;
    a preset current source, having the preset current value, having one terminal connected to a power voltage, having another terminal connected to one terminal of the charging switch; and
    N compensating current sources, respectively having a compensating current value, having one terminal connected to the power voltage, having another terminal respectively connected to one terminal of N compensation switches correspondingly, wherein another terminal of the compensation switches are connected to one terminal of the charging switch and receive the count value so as to determine switched-on or switched-off state, wherein current value of the first current is equal to sum of preset current value and M compensating current value, and N is positive integer and M is integer ranged from zero to N.

7. A method for auto-calibrating rotation speed error, used for a rotation speed control circuit, the rotation speed control circuit comprises a first multiplexer, a second multiplexer, an error amplifier, a current compensation circuit, a sampling and hold circuit and a comparator, wherein the first multiplexer is connected to a calibration clock signal and a rotation speed clock signal, and outputs a first switch signal according to a mode switch signal and after an edge-trigger detector receives the first switch signal, the edge-trigger detector respectively outputs a second switch signal and a third switch signal with high voltage level in the duration of high voltage level of the first switch signal, and the second multiplexer is connected to a calibration voltage and a reference voltage and outputs a target voltage according to the mode switch signal, and the error amplifier is connected to an external capacitor and the second multiplexer so as to respectively receive a capacitor voltage and the target voltage and accordingly outputs an error voltage, the current compensation circuit is connected to the first switch signal for compensating the external capacitor via adjusting current value of the first current, a sampling and hold circuit is connected to the error amplifier for receiving the second switch signal and accordingly sampling the error voltage and maintaining for a period of time, and outputting an sampling and hold voltage signal, and a comparator receives a preset triangular wave signal and the sampling and hold voltage signal and accordingly performs comparison operation so as to output a PWM rotation speed signal, the method for auto-calibrating rotation speed error comprising:

entering into a calibration mode according to the mode switch signal;
choosing the calibration clock signal and the calibration voltage;
compensating the external capacitor via adjusting current value of the first current;
determining whether the capacitor voltage is larger than or equal to target voltage;
when the capacitor voltage is larger than or equal to target voltage, a calibration task is finished and voltage level of the error voltage is changed to high voltage level;
sampling the error voltage according to the second switch signal and outputting the sampling and hold voltage signal; and
comparing the preset triangular wave signal with the sampling and hold voltage signal to output the PWM rotation speed signal;
wherein the current compensation circuit makes current value of the first current increase gradually so as to increase the capacitor voltage until the capacitor voltage is equal to the target voltage, for compensating change of the external capacitor.

8. The method for auto-calibrating rotation speed error according to claim 7, wherein when capacitance value of the external capacitor deviates a preset capacitance value from capacitance value of X unit, the current compensation circuit gradually adjusts current value of the first current so as to compensate change of external capacitor, wherein X is a positive integer and current value of each unit of the first current corresponds to capacitance value of each unit of the external capacitor.

9. The method for auto-calibrating rotation speed error according to claim 7, wherein the mode switch signal is used for determining whether the rotation speed control circuit is in the calibration mode or a normal mode, and when the rotation speed control circuit is in the normal mode, the first multiplexer chooses the rotation speed clock signal and the second multiplexer chooses the reference voltage.

10. The method for auto-calibrating rotation speed error according to claim 9, wherein after an electronic system with the rotation speed control circuit boosts, in a transient duration of boosting, the rotation speed control circuit enters into the calibration mode firstly and then the rotation speed control circuit enters into the calibration mode after each normal operation period, and the rotation speed control circuit enters into the normal mode between the two calibration modes adjacent after boosting of the electronic system.

11. The method for auto-calibrating rotation speed error according to claim 7, further comprising:
a charging switch, having one terminal connected to the current compensation circuit, having another terminal connected to the external capacitor and the error amplifier, the charging switch determining switched-on or switched-off state according to the first switch signal, wherein when the charging switch is switched-on, the current compensation circuit outputs the first current for charging the external capacitor; and
a discharging switch, having one terminal connected to the external capacitor and the error amplifier, having another terminal connected to a ground voltage, the discharging switch determining switched-on or switched-off state according to the third switch signal, wherein when the discharging switch is switched-on, the external capacitor releases the capacitor voltage,
wherein in the calibration mode, when the first switch signal is changed from high voltage level to low voltage level, the third switch signal is changed from low voltage level to high voltage level.

12. The method for auto-calibrating rotation speed error according to claim 11, wherein the current compensation circuit comprises:
a counter, receiving the error voltage and accordingly dominating a count value outputted, wherein in the calibration mode, when voltage level of the error voltage is low voltage level, the counter gradually adjusts the count value, and when voltage level of the error voltage is high voltage level, the counter maintains the count value;
a preset current source, having the preset current value, having one terminal connected to a power voltage, having another terminal connected to one terminal of the charging switch; and
N compensating current sources, respectively having a compensating current value, having one terminal connected to the power voltage, having another terminal respectively connected to one terminal of N compensation switches correspondingly, wherein another terminal of the compensation switches are connected to one terminal of the charging switch and receive the count value so as to determine switched-on or switched-off state, wherein current value of the first current is equal to sum of preset current value and M compensating current value, and N is positive integer and M is integer ranged from zero to N.

13. A fan system, comprising:
a rotation speed control circuit, receiving a rotation speed clock signal, for controlling rotation speed;
a fan driving circuit, connected to the rotation speed control circuit and receiving a PWM rotation speed signal;
a fan, connected to the fan driving circuit; and
a feedback circuit, generating the rotation speed clock signal and transmitting the rotation speed clock signal to the rotation speed control circuit according to rotation speed of the fan,
wherein the fan system performs a calibration task through utilizing the method for auto-calibrating rotation speed error according to claim 7.

14. The fan system according to claim 13, wherein the rotation speed control circuit comprises:
a first multiplexer, connected to a calibration clock signal and a rotation speed clock signal, for outputting a first switch signal according to a mode switch signal, wherein after an edge-trigger detector receives the first switch signal, the edge-trigger detector respectively outputs a second switch signal and a third switch signal with high voltage level when the first switch signal is in high voltage level;
a second multiplexer, connected to a calibration voltage and a reference voltage, for outputting a target voltage according to the mode switch signal;
an error amplifier, connected to an external capacitor and the second multiplexer, for outputting an error voltage according to a capacitor voltage and the target voltage; and
a current compensation circuit, having a preset current value, connected to the first switch signal, the current compensation circuit adjusting a first current so as to compensate the external capacitor,
wherein in a calibration mode, the first and the second multiplexer choose the calibration clock signal and the calibration voltage respectively according to the mode switch signal and the rotation speed control circuit adjusts current value of the first current, wherein when the capacitor voltage of the external capacitor is larger than or equal to the target voltage, a calibration task is finished and voltage level of the error voltage is changed to high voltage level so that the current compensation circuit stops adjusting current value of the first current for compensating the external capacitor.

15. The fan system according to claim 13, wherein the rotation speed control circuit further comprises:
a sampling and hold circuit, connected to the error amplifier, for receiving the second switch signal and accordingly sampling the error voltage and maintaining for a period of time, and outputting an sampling and hold voltage signal; and
a comparator, receiving a preset triangular wave signal and the sampling and hold voltage signal and accordingly performing comparison operation so as to output a PWM rotation speed signal.

16. The fan system according to claim 13, wherein when capacitance value of the external capacitor deviates a preset capacitance value from capacitance value of X unit, the current compensation circuit gradually adjusts current value of the first current so as to compensate change of external capacitor, wherein X is a positive integer and current value of each unit of the first current corresponds to capacitance value of each unit of the external capacitor.

17. The fan system according to claim 13, wherein the current compensation circuit makes current value of the first current increase gradually so as to increase the capacitor voltage until the capacitor voltage is equal to the target voltage, for compensating change of the external capacitor.

* * * * *